United States Patent
Schlör et al.

[11] Patent Number: 5,779,747
[45] Date of Patent: Jul. 14, 1998

[54] FLEXIBLE FOLDED FILTER INSERT

[75] Inventors: Ulrich Schlör, Darmstadt; Dieter Hintenlang, Absteinach, both of Germany

[73] Assignee: Firma Carl Freudenberg, Weinheim, Germany

[21] Appl. No.: 691,717

[22] Filed: Aug. 2, 1996

[30] Foreign Application Priority Data

Aug. 4, 1995 [DE] Germany ............ 195 28 670.7

[51] Int. Cl.$^6$ .................................. B01D 27/06
[52] U.S. Cl. ................................. 55/497; 55/521
[58] Field of Search ............ 55/497, 521, DIG. 12, 55/382, 385.1

[56] References Cited

U.S. PATENT DOCUMENTS

| | | |
|---|---|---|
| 5,501,794 | 3/1996 | Van de Graaf et al. ......... 55/521 |
| 5,595,582 | 1/1997 | Junker ............................ 55/497 |

*Primary Examiner*—Jay H. Woo
*Assistant Examiner*—Minh-Chau T. Pham
*Attorney, Agent, or Firm*—Kenyon & Kenyon

[57] ABSTRACT

A flexible folded filter insert which is not noticeably deformed by the air which it cleans. The insert has a fold pattern which is closed off at the ends by flexible strips which can be compressed in the longitudinal direction.

16 Claims, 1 Drawing Sheet

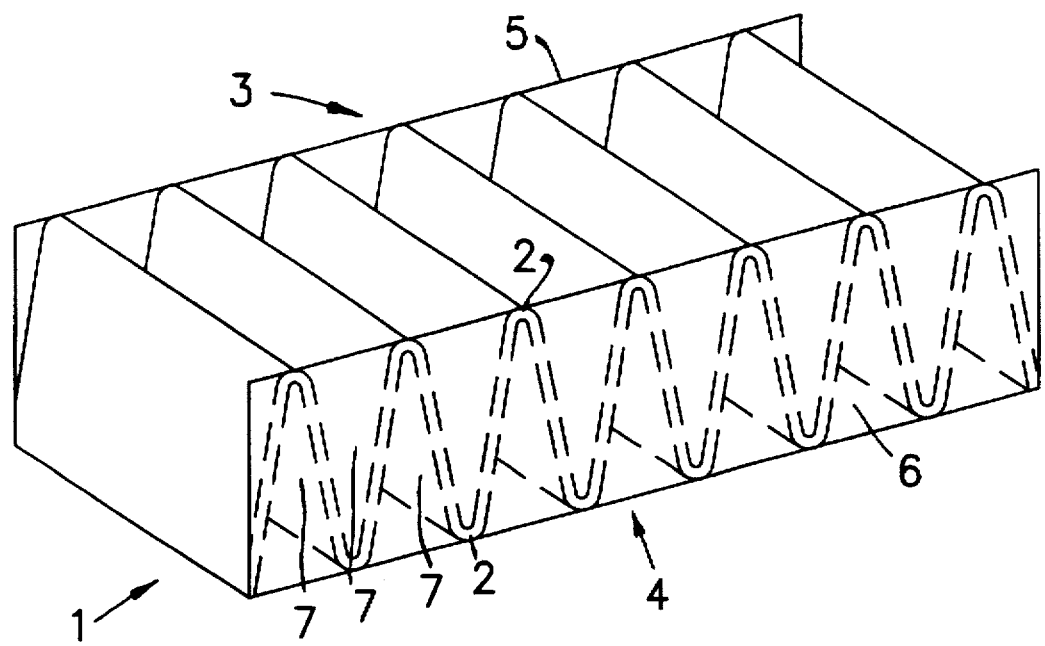

FLEXIBLE FOLDED FILTER INSERT

BACKGROUND OF THE INVENTION

The invention relates generally to a flexible folded filter insert which is not noticeably deformed by the air which it cleans, the filter having a fold pattern which is closed off at its ends.

Filter inserts made of filter strip material folded in a zig-zag pattern are generally known. As a rule, the ends of the folds are sealed by gluing on or bonding them onto frame parts. In part, the connection between the filter material and the frame is produced by means of a casting compound. The production of such connections is timeconsuming. For example, the production of a connection using a casting compound requires a device which holds the filter material in a frame until the casting compound has been poured in and has solidified.

In the known filters, a seal is provided on all sides of the housing, which run essentially parallel to the incoming flow direction, in order to prevent the medium to be filtered from flowing around from the incoming flow side to the outgoing flow side, thereby circumventing the filter insert. Furthermore, the known folded filter inserts are provided with an inflexible frame, which does not permit any change in the shape of the folded filter insert without destruction of the frame and/or the connection between the folded filter and the frame.

The shape of the housing is increasingly adapted to the special conditions attendant to fitting the filter within tight installation spaces, for example the engine compartment of a motor vehicle. In such applications it may be that the holder for the filter insert is itself twisted, making it necessary to further deform the filter insert (which is produced in a flat state) during installation. In this connection, no damage can be permitted to occur, and a dust-proof connection with regard to the holder must be assured. However, the housings themselves are increasingly located in regions in the installation area which are not easily accessible, requiring further deformation of the filter insert during installation.

Thus, there remains a need for a folded filter insert which can be deformed without being damaged, which is easy to manufacture, and which makes it possible to dispense with the use of additional seals when installed in a housing.

SUMMARY OF THE INVENTION

The present invention provides for a flexible folded insert that does not undergo appreciable deformation by the air which it cleans. The insert has a fold pattern which is closed off at its ends. The fold pattern is closed off on both sides by flexible strips which can be compressed in the longitudinal direction.

BRIEF DESCRIPTION OF THE DRAWING

The figure is a perspective view (partially in phantom) of a folder filter insert constructed according to the principles of the invention.

DETAILED DESCRIPTION

According to one embodiment of the present invention, the fold pattern 2 of a folded filter insert 1 is closed off on both sides by flexible strips 5 and 6 which can be compressed in the longitudinal direction. Because of its fold formation, the folded filter insert 1 has V-shaped openings along the entire length of its ends, which must be closed off. The strips 5 and 6 with which this closure is accomplished permit compression in the longitudinal direction, resulting in a flexible frame. An advantage of the folded filter insert according to the invention lies in its flexibility in the longitudinal direction, as compared with an inflexible folded filter insert, which makes it possible to even out greater production tolerances with respect to longitudinal expansion. Production with greater dimensional tolerances permits more cost-effective production with greater numbers of pieces. Because of the elasticity of the strips 5 and 6, torsion of the folded filter insert relative to an axis along the fold pattern and/or bending with reference to at least one axis crosswise to the fold pattern is possible, where bending can be in the same direction and/or the opposite direction with reference to an axis which runs parallel to an end. This enables the insertion or push of the filter into a correspondingly shaped holder, in the direction of the fold pattern. The deformability of the folded filter insert in the manner described above permits its installation even in housings which are positioned in very inaccessible locations in the installation space, in contrast to inflexible filter inserts.

It is advantageous that the strips, viewed crosswise to the fold pattern, be compressible to at least three-fourths of their thickness in the unstressed state. In order to insert the folded filter insert 1 according to the invention into a holder, the strips 5 and 6 which delimit the crosswise expansion of the folded filter insert, are reduced in thickness. Because of the flexibility of the strips 5 and 6 with regard to their thickness, only significantly greater (i.e., broader) tolerances have to be maintained in their production, as compared with the production of inflexible filters, since greater dimensional differences, both in the folded filter insert and in its holder, can be evened out by the compression and the elastic behavior of the strips. Hence it is still possible to insert the folded filter insert into a holder with great dimensional inaccuracies.

Because of its elastic behavior, partial relaxation of the strips in the crosswise direction occurs after installation, resulting in a pressure seal against the walls of the filter holder which run parallel to the ends of the folded filter insert. In order to achieve a sufficiently great pressure force, the strips 5, 6 must be compressed to at least three-fourths of their thickness in the unstressed state. This obviates the need for the use of additional seals between the strips to delimit the crosswise orientation of the folded filter insert and the walls of the holder which lie opposite them.

In a preferred embodiment, the strips 5, 6 have a thickness of 0.2 to 20 mm. The lower thickness limit is driven primarily from considerations of ease in handling the strips during the production process, as well as the ability to manufacture the material. Furthermore, the strips provide the folded filter insert with additional mechanical stability, so that a minimum thickness Of the strips used is necessary as a function of the dimensions of the folded filter insert.

Where it is desired that the strips simultaneously act as a seal relative to the holder walls, their thickness should be dimensioned in such a way that sufficiently great compression of the strips and, therefore, a pressure force which corresponds to the elastic resilience force, is achieved, resulting in a seal contact of the strips against the housing walls. The upper limit of the strip thickness is determined by the need to use a practical amount of material and by the filter area, which decreases in proportion to the filter width.

The strips 5 and 6 are preferably made from a nonwoven material, a knit material, a woven material and/or a soft foam. The strips which are produced from these materials can be elastically compressed in both their longitudinal direction and with respect to their thickness. Consequently, the folded filter insert makes seal contact with the sides of the holder after partial relaxation of the strips. Also, they give the folded filter insert a certain stability, so that it is easy to handle during subsequent assembly and installation in a housing. Furthermore, with the use of these materials, it is possible to attach the strips on the ends of the folds in simple manner, for example by gluing or bonding.

It is advantageous that the strips 5 and 6 be glued onto the ends of the fold pattern 2. Bonding the strips onto the ends of the folded filter is also possible. In order to achieve closing of the ends of the folded filter with the strips, the strips are glued onto the fold pattern 2, resulting in a connection which is quickly and easily produced, and which provides a low cost means of sealing off the joints.

For adhesion, a glue is preferably employed, with at least the interstices 7 of the fold pattern being free of adhesive. The production of the glue connection is performed using the edge glue technique. The adhesive is applied to one side of the strips 5 and 6, and these are then pressed against the ends 3 and 4 of the filter material with this side and glued onto them. In another possible method, only the butt edge of the folded bellows is wetted with adhesive and the frame material which forms the strip runs in without having adhesive applied to it, and is pressed against the end of the folded filter and glued onto it. When using this method of production, the interstices 7 remain free of adhesive, which means that no reduction in the filter area and, therefore, no performance loss in mass throughput of the air to be cleaned takes place. Because of the separate feed of the adhesive, it can be coordinated with the dimensions and the materials to be glued together. By using glue, it is possible to make the frame with bondable and non-bondable materials, which in turn can again act as filters. It is possible to glue the strips together with single-layer or multi-layer filter materials, such as particle filters and/or odor filters.

The glue is arranged in partial regions at a distance from one another. The adhesive does not wet the entire surface of the strips, but rather only the regions in which there is a join with the ends of the folded filter, saving glue. Furthermore, there is no reduction of the compressibility of the strips due to adhesive which has been applied to the strips in the interstices of the V-shaped openings and solidified after closure of the ends. Torsion of the folded filter insert relative to an axis along the fold pattern and bending relative to at least one axis crosswise to he fold pattern is possible, due to the high flexibility of the strips.

The glue employed should be deformable and/or elastic in the solidified state. The glue must be deformable even in the solidified state, since this assures that compression in the longitudinal direction, bending around at least one axis crosswise to the fold pattern and/or torsion of the folded filter insert around an axis along the fold pattern does not result in destruction of a glue bond.

Flexible folded filter inserts allow installation in non-level holders located at sites in the installation space which are not easily accessible. This is of enormous advantage as compared with non-flexible folded filter inserts, particularly since production is possible with more generous tolerances on the part of the folded filter and the housing.

What is claimed is:

1. A device for filtering air, comprising:
   a flexible folded filter insert that maintains the shape in operation, the insert having a fold pattern and two ends; and
   a plurality of flexible strips which are compressible in the longitudinal direction, said flexible strips being located so as to close off the ends of the flexible folded filter insert, said flexible strips further being compressible, viewed crosswise relative to the fold pattern, to at least three-fourths of the thickness in the unstressed state.

2. The folded filter insert according to claim 1, wherein strips have a thickness of 0.2 to 20 mm.

3. The device as set forth in claim 1, wherein the strips comprise one of a nonwoven material, a knit material, a woven material and a soft foam.

4. The device as set forth in claim 1, wherein the strips are glued onto the ends of the fold pattern.

5. The device as set forth in claim 4, further comprising a glue, and wherein at least the interstices of the fold pattern are free of said glue.

6. The device as set forth in claim 5, wherein the glue is arranged in partial regions which are spaced a distance from one another.

7. The device as set forth in claim 4, wherein the glue is deformable in the solidified state.

8. The device as set forth in claim 5, wherein the glue is elastic in the solidified state.

9. The device as set forth in claim 6, wherein the glue is both deformable and elastic in the solidified state.

10. A device for filtering air, comprising:
    a flexible folded filter insert having a longitudinal extent and fold lines orthogonal to the longitudinal extent of the insert, said insert being sufficiently rigid to maintain the shape in operation, the insert having a fold pattern defined by said fold lines, and a pair of longitudinally extending edges; and
    a plurality of flexible strips which are compressible, said flexible strips being attached to the edges of the insert, said flexible strips further being compressible, viewed crosswise relative to the fold pattern, to at least three-fourths of the thickness in the unstressed state.

11. The folded filter insert according to claim 10, wherein strips have a thickness of 0.2 to 20 mm.

12. The device as set forth in claim 10, wherein the strips comprise one of a nonwoven material, a knit material, a woven material and a soft foam.

13. The device as set forth in claim 10, wherein the strips are made of a nonwoven material.

14. The device as set forth in claim 10, wherein the strips are made of a woven or knit material.

15. The device as set forth in claim 10, wherein the strips are made of a soft foam.

16. The device as set forth in claim 10, wherein the strips are adhesively attached onto the edges of the filter.

* * * * *